United States Patent [19]

Kuttner

[11] Patent Number: 4,800,324
[45] Date of Patent: Jan. 24, 1989

[54] BRUSH MOTOR AMPLIFIER WITH OVERSPEED PROTECTION

[75] Inventor: Ralph Kuttner, Fullerton, Calif.

[73] Assignee: Steel Casting Engineering, Ltd., Orange, Calif.

[21] Appl. No.: 932,663

[22] Filed: Nov. 19, 1986

[51] Int. Cl.[4] .............................................. H02P 5/06
[52] U.S. Cl. ..................................... 318/293; 318/312
[58] Field of Search ............... 318/257, 293, 294, 312, 318/313, 326, 327

[56] References Cited

U.S. PATENT DOCUMENTS

| | | | |
|---|---|---|---|
| 3,426,262 | 2/1969 | Colter | 318/326 X |
| 4,486,692 | 12/1984 | Sonoda et al. | 318/327 X |
| 4,514,666 | 4/1985 | Suzuki | 318/293 |
| 4,570,110 | 2/1986 | Bloom et al. | 318/313 |
| 4,599,545 | 7/1986 | Moriki et al. | 318/326 X |

*Primary Examiner*—Bentsu Ro
*Attorney, Agent, or Firm*—Roy A. Ekstrand

[57] ABSTRACT

A DC brush motor amplifier control includes a current switch power supply together with switching logic for operating the motor in response to a predetermined motor current signal. An encoder coupled to the DC brush motor provides a feedback signal used to control the motor operation. An overspeed detection system senses motor speeds in excess of a predetermined threshold and disables the switching logic to avoid overspeed failure.

3 Claims, 4 Drawing Sheets

BRUSH MOTOR AMPLIFIER WITH OVERSPEED PROTECTION

FIELD OF THE INVENTION

This invention relates generally to motor control amplifiers and particularly to amplifier control systems operative upon brush-type DC motors.

BACKGROUND OF THE INVENTION

Many electrical systems incorporate one or more large electrical motors operative to move heavy loads in environments in which extreme precision of motor control is required. Often, a brush-type DC motor is utilized to provide the power for such systems. Examples of systems requiring large high-power, precision controlled operation include locking radar antenna, rotating weapons platforms, horizontal continuous casting, printing machinery and heavy equipment assembly line operations. In such systems, the control of the brush DC motor to the precision required by the application is often difficult to achieve in view of the high currents which the system utilizes and the precision of control coupled with the heavy inertia generally found in the system loads. To meet the control requirements of such systems, practitioners in the art have created a family of devices often referred to as brush motor controllers or servo motor amplifiers. Such control amplifiers provide the basic function of precision control of the large DC armature currents present in the brush motors, usually under the control of a low voltage control system, which itself may be computerized and extremely sophisticated. In the majority of applications of the foregoing described systems, there frequently exists circumstances in the operative environment which require that certain operational limits be placed upon the motor system to protect against potential system failures.

In brush motor amplifier systems in which the angular position of the motor armature must necessarily be determined accurately, a digital encoder is often mechanically coupled to the armature of the motor and provides a digitized signal input to the electronic control system used to operate the brush motor amplifier and the brush motor. Frequently, a computerized system is operative in response to the digitized output of the encoder to provide the various control and error signals necessary to operate the brush motor in accordance with the desired system motion. For example, in the horizontal continuous casting art in which an elongated billet is continuously formed and moved along a casting bed in accordance with a predetermined motion profile, a plurality of individually controlled drive motors are operative upon the casting. In the case of horizontal continuous casting, it is extremely important that the physical position of the billet be communicated to the casting control system at all times. By way of further example, in the use of locking radar antenna, it is extremely important that the rotational position of the radar antenna be accurately communicated to the computing and display portions of the radar system. Many other systems using such high power brush DC motors impose a similar requirement for precise determination of the angular position of the motor armature.

A problem arises in many encoder driven systems in that the system precision mandates that the encoder be capable of resolving the armature position to a very small increment. On the other hand, where the system requires relatively higher speed motion of the armature of the motor, there arises a potential that the system will erroneously interpret the higher speed of the encoder as a continuous line rather than a succession of high speed passing segments. In such case, a failure mode is entered, often at high consequence, in which the system perceives that the load is static rather than moving and increases current to the motor. The failure mode, once entered, continues to increase unchecked until some physical limit of the system is reached.

In systems utilizing other means of determining the position of the armature, the basic system potential for failure often continues to exist. This potential arises from the fact that characteristics utilized to improve system resolution generally raise the possibility that a similar system error to that described above for encoders may occur. In essence, the high resolution of the system makes it vulnerable to misinterpretation of incoming data at higher system speeds.

There exists therefore a need in the art for an improved brush motor control system which avoids the foregoing described overspeed failure mechanism.

SUMMARY OF THE INVENTION

Accordingly, it is a general object of the present invention to provide an improved brush motor amplifier. It is a more particular object of the present invention to provide an improved brush motor amplifier having an overspeed protection system which averts overspeed failure modes without compromising the basic system resolution.

In accordance with the present invention there is provided a brush motor amplifier in which a brush motor is driven by a square wave switching system under the control of a plurality of switching drivers. An encoder is coupled to the motor armature and provides position and speed information to the system. An overspeed detector is coupled to and operative upon the output of the positional indicator to provide an excess speed signal output when a predetermined armature speed is exceeded. A plurality of gate circuits are coupled to the switching drivers and provide the operational signals thereto in the correct timing relationship to properly switch current through the motor. A shut down system is coupled to the overspeed detector and the gate arrangement and is operative in response to the overspeed signal to disable the operation of the gates and terminate the application of power to the brush motor.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

DESCRIPTION OF THE PREFERRED EMBODIMENTS

Figure 1:
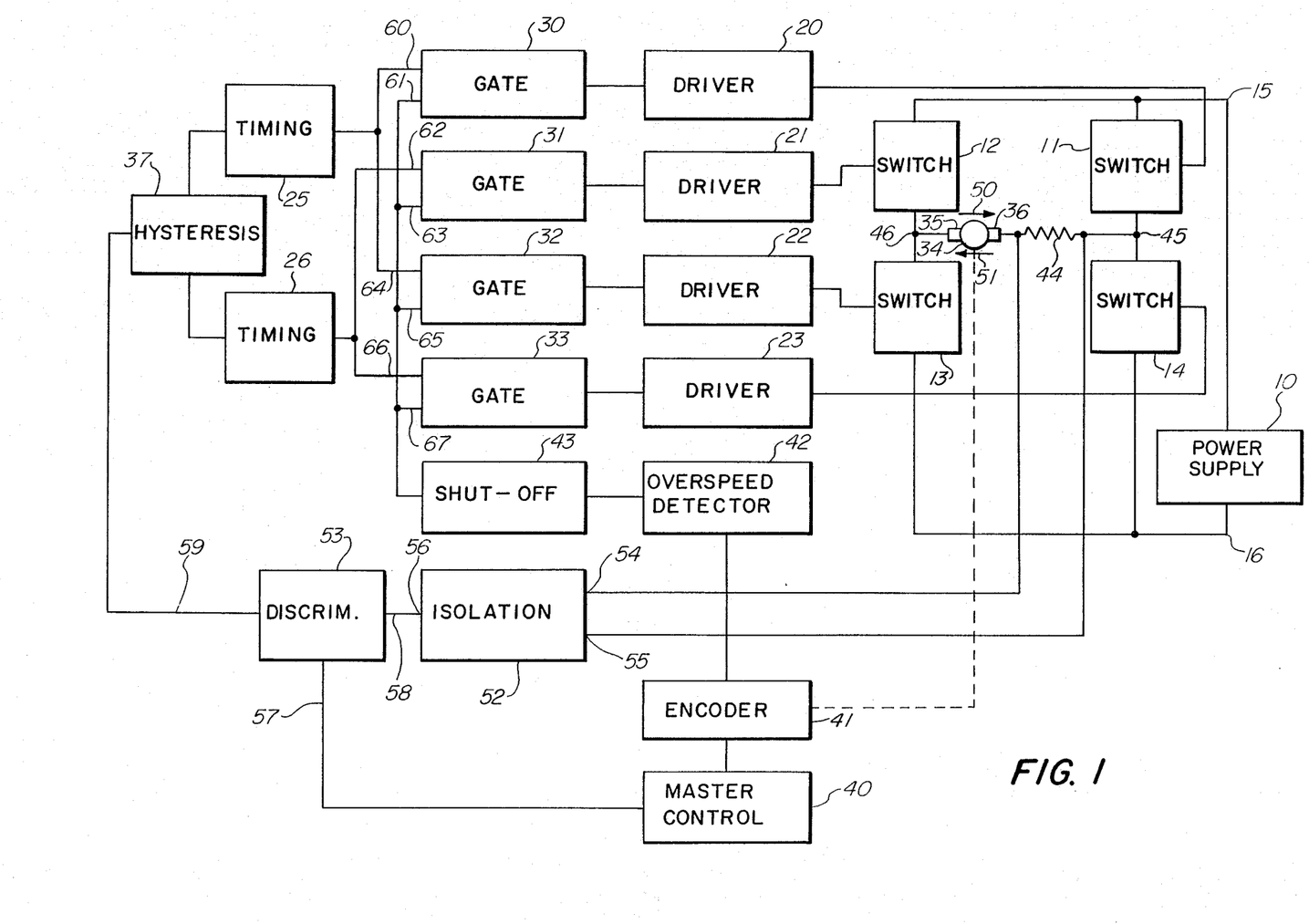
FIG. 1 is a block diagram of the present invention brush motor amplifier with overspeed protection.

FIG. 1 sets forth a block diagram of a brush motor amplifier control constructed in accordance with the present invention. A DC power supply 10 provides a source of operating DC power and includes a positive terminal 15 and a negative terminal 16. A switching circuit 11 is coupled between positive terminal 15 and a junction 45. A switching circuit 14 is coupled between junction 45 and negative terminal 16. A switching circuit 12 is coupled between positive terminal 15 and a junction 46 and a switching circuit 13 is coupled between junction 46 and negative terminal 16. A brush-type DC motor 34 defines an armature terminal 35 coupled to junction 46 and an armature terminal 36. A current shunt resistor 44 is coupled between junction 45 and armature terminal 36. A quartet of driver circuits 20, 21, 22 and 23 are coupled to switching circuits 11, 12, 13 and 14 respectively. A quartet of gate circuits 30, 31, 32, and 33 are coupled to driver circuits 20, 21, 22 and 23 respectively. A shut-off circuit 43 is coupled commonly to gates 30, 31, 32, and 33. An overspeed detector 42 is coupled to shut-off 43. An armature encoder 41 is mechanically coupled to the armature of motor 34 by a coupling not shown in FIG. 1 and is coupled electrically to overspeed detector 42. A master control 40, which may for example, comprise a digital electronic control system, is coupled to armature encoder 41. A timing circuit 25 is coupled to gates 30 and 32 and a timing circuit 26 is coupled to gates 31 and 33. A hysteresis circuit 37 is coupled to timing circuits 25 and 26.

An isolation amplifier 52 includes a pair of input terminals 54 and 55 and an output terminal 56. Input terminal 54 of isolation amplifier 52 is coupled to armature 36 while input terminal 55 is coupled to junction 45. A discriminator circuit 53 has input terminals 57 and 58 and an output terminal 59. Input terminal 57 is coupled to master control circuit control 40 while input 58 is coupled to output 56 of isolation amplifier 52. Discriminator output terminal 59 is coupled to hysteresis circuit 34.

In operation and assuming motor 34 is mechanically coupled to a suitable load, such as a horizontal continuous casting billet and further assuming that motor 34 is initially at rest, master control 40, which may comprise any number of systems for providing a desired input signal voltage for establishing the desired current in motor 34 but which, in its preferred form, is a digital computer control system which provides a time varying signal to input 57 of discriminator 53. While the frequency of signal applied to input 57 by master control 40 is to a great extent a matter of design choice, it has been found advantageous to select a signal frequency of between 2 and 3 kilohertz for large brush-type DC motors. The input at input terminal 57 of Discriminator 53 therefore comprises a computer produced digitized signal which corresponds to the motor voltage intended to produce the desired motion of motor 34 and thereby its driven load. Inputs 54 and 55 of isolation amplifier 52 receive the voltage developed across resistor 44 which, because of its position within the armature circuit of motor 34, corresponds to the armature current within motor 34. As a result, isolation amplifier 52 receives a voltage at inputs 54 and 55 indicative of armature current in motor 34. This motor current indicative signal is amplified by isolation amplifier 52 to produce an increased power output signal at output terminal 56 which is coupled to input 58 of discriminator 53. Discriminator 53 may be any of the well-known voltage discrimination circuits which function to compare input signals and produce an error signal corresponding to the difference between the two inputs. In this case, discriminator 53 makes a comparison of the input control signal at input 57 and the actual motor current at input 58 and produces an error signal at output terminal 59 indicative of the difference therebetween. In a case of initial start-up of motor 34 there will be virtually no input signal at input 58 and discriminator 53 will produce an output error signal at terminal 59 which is the maximum error signal producible by the discriminator. Because the input during initial start-up at terminal 58 is substantially less than that at terminal 57, the output signal at output terminal 59 will be a signal indicative of the need for the system to increase motor current.

The discriminator output error signal at terminal 59 is applied to a hysteresis circuit 37 which includes a bistable amplifier operable in either of two voltage states. Hysteresis circuit 37 operates in either of its two stable voltage states in response to the condition of the error signal at output terminal 59 of discriminator 53. Timing circuit 25 is responsive to one of the voltage states of hysteresis circuit 37 while timing circuit 26 is responsive to the remaining voltage state. The construction of hysteresis circuit 37 and timing circuits 25 and 26 is set forth below in greater detail. In addition, as is set forth below in greater detail, timing circuits 25 and 26 further include means for assuring that the timing circuits operate in an exclusive manner such that both timing circuits are not active at the same time.

The output signal of timing circuit 25 comprises an enabling signal which is coupled to gates 30 and 32. Conversely, the output of timing circuit 26 comprises a second enabling signal which is coupled to one input of gates 31 and 33. Gates 30 through 33 comprise gate matrix circuits which function in an AND gate configuration such that an output signal is produced in response to the coincident inputs of two signals at the gate. Therefore, timing circuit 25 produces an enabling signal which is coupled to inputs 60 and 64 of gates 30 and 32 respectively. Similarly, timing circuit 26 produces an enabling signal which is coupled to inputs 62 and 66 of gates 31 and 33 respectively. The remaining input terminals 61, 63, 65 and 67 of gates 30 through 33 respectively are coupled to a shut-off circuit 43, the functions of which will be set forth in greater detail. However, suffice it to state here that shut-off circuit 43 supplies an enabling signal to inputs 61, 63, 65 and 67 of gates 30 through 33 respectively. As a result, gates 30 and 32 are operative to produce output signals at output terminals 68 and 70 respectively only during the presence of an enabling signal from timing circuit 25. Similarly, gates 31 and 33 produce output signals at their respective output terminals 69 and 71 only during the presence of an enabling signal from timing circuit 26.

Because gates 30 and 32 are operated simultaneously by timing circuit 25, the output signals at terminals 68 and 70 of gates 30 and 32 respectively are coincident. Similarly, because gates 31 and 33 are simultaneously operated by timing circuit 26, the output signals of gates 31 and 33 at output terminal 69 and 71 are coincident. As mentioned, timing circuts 25 and 26 operate exclusive of each other such that no simultaneous operation of the timing circuits occurs. As a result, coincident output signals are present at terminals 68 and 70 at times when no output signal is present at output terminal 69 and 71. Conversely, output signals are present at output terminals 69 and 71 at times when no output signal is present at output terminals 68 and 70. Driver 20, which comprises a signal amplifying circuit, increases the power of the output signal at terminal 68 and couples it to a power switching circuit 11. The structure of driver 20 is set forth below in greater detail. Suffice it to note here however that the function of driver 20 is to raise the power of the output of gate 30 to a level sufficient to drive power switching circuit 11. Driver 21 performs a similar power gain function for the output of gate 31 and couples it to a power switching circuit 12. Similarly, driver 22 amplifies and couples the output signal of gate 32 to power switching circuit 13 and driver 23 amplifies and couples the output of gate 33 to power switching circuit 14.

Power switching circuits 11, 12, 13 and 14 are substantially identical in structure and are set forth below in greater detail. For purposes of explanation here however, it is sufficient to understand that power switching circuits 11 through 14 are operative in response to their respective driver output signals to conduct maximum current when an output signal is applied from their respective drivers and to remain nonconducting in the absence of such driver output signal. It should be noted that in accordance with the foregoing description of timing circuits 25 and 26, drivers 20 and 22 are simultaneously operated and drivers 21 and 23 are simultaneously operated. As a result, switches 11 and 13 are operated simultaneously as are switches 12 and 14. In accordance with switch mode power design, the current through motor 34 produced by DC power source 10, flows in the direction of arrow 50 when switches 12 and 14 are activated. Conversely, current flows through motor 34 in the direction of arrow 51 when switches 11 and 13 are activated.

As a result, the current through motor 34 is controlled by the respective operation of timing circuits 25 and 26 through the activation of the gate and driver circuits applied to the power switching circuits. Simply stated, timing circuit 25 activates gates 30 and 32 simultaneously which in turn operates drivers 20 and 22 simultaneously which in turn turns on power switching circuits 11 and 13 causing current to flow from positive terminal 15 through switch 11 and thereafter through motor 34 in the direction of arrow 51 and then through power switching circuit 13 to negative potential terminsal 16. Conversely, the operation of timing circuit 26 activates gates 31 and 33 which operate drivers 21 and 23 which in turn turns on power switching circuits 12 and 14. In such case, current flows from positive terminal 15 through power switching circuit 12 and through motor 34 in the direction of arrow 50 and then through power switching circuit 14 to negative terminal 16.

During the initial start-up operation, master control 40 continues to apply the desired motor operations signal at terminal 57 and timing circuits 25 and 26 are operated in response thereto to cause current to flow in the desired direction through motor 34. As current through motor 34 increases as a result of the operation of switching circuits 11 through 14, the voltage produced across current sensing resistor 44 increases the input voltage to isolation amplifier 52 which in turn applies this increased current indicative signal to discriminator 58. At a certain point, the voltage developed across resistor 44 produces a signal through isolation amplifier 52 at discriminator terminal 58 which approaches the desired motor input signal at terminal 57. As the system approaches equilibrium, operation of hysteresis circuit 37 and timing circuits 25 and 26 provide activation of switching circuits 11 and 13 and 12 and 14 in accordance with the differential between actual motor current sensed by resistor 44 and the desired motor current indicated by input signal 57. In essence, switching circuits 11 through 14 are operative to apply square wave voltage signals in which the resultant current through motor 34 is controlled by the timing and duration of the operation of the respective switching circuits. For example, to operate motor 34 in a direction corresponding to increased current in direction 50, switching circuits 12 and 14 are operated for longer intervals than switching circuits 11 and 13. Conversely, to produce that current through motor 34 in the direction of arrow 51, switching circuits 11 and 13 are operated for longer durations than switching circuits 12 and 14.

In accordance with the control function of master control 40 and as mentioned above, armature encoder 41 is mechanically coupled to the armature of motor 34. While armature encoder 41 may comprise any number of position detection mechanisms, in its preferred form, armature encoder 41 comprises a optical coupling system in which a optically slotted member rotates in conjunction with the armature of motor 34 and produces an output signal pulse for each increment of armature motion of motor 34. In essence, armature encoder 41 produces a train of pulse signals as the armature of motor 34 rotates. These pulse signals are applied to master control 40 and are operative to permit master control 40 to adjust the output signal at terminal 57 of discriminator 53 in accordance with a desired armature motion profile. In the case for example of horizontal continuous casting, the operation of master control 40 functions to produce an output signal at terminal 57 of discriminator 53 which is proportional to the force required to produce the desired motion profile of the casting billet. In addition and in accordance with an important aspect of the present invention, the output of encoder 41 is coupled to an overspeed detector 42. Overspeed detector 42 comprises a frequency to voltage converter, the details of which are set forth below in greater detail. However, suffice it to note here that in response to the train of input pulses to armature encoder 41, overspeed detector 42 produces an output voltage indicative of the frequency of pulse occurence from encoder 41. In essence, overspeed detector 42 functions to frequency detect the motion of the armature of motor 34 which in turn translates to the rotational speed of the motor armature. The output frequency indicative voltage of overspeed detector 42 is applied to a shut-off circuit 43 which in turn is commonly coupled to the second inputs 61, 63, 65 and 67 of gates 30 through 33 respectively. As mentioned, in the absence of signal output by shut-off 43, gates 30 through 33 respectively will not respond to the respective timing signals produced by timing circuits 25 and 26. Accordingly, shut-off 43, in its normal mode, produces an output signal which enables gates 30 through 33 to function in the presence of applied signals from timing circuits 25 and 26. Conversely, however, shut-off 43 in the off condition, gates 30 through 33 do not respond to timing circuits 25 and 26 and accordingly, switches 11 through 14 remain inoperative and motor 34 receives no current. Returning to overspeed detector 42, the output voltage therefrom which, as mentioned, is a function of the frequency of armature encoder rotation is operative upon a threshold circuit within shut-off circuit 43, the details of which are set forth below in greater detail. Simply stated here however, shut-off 43 responds to a predetermined voltage threshold from overspeed detector 42 to interrupt the enabling voltage at gates 30 through 33 when the overspeed detector voltage exceeds a predetermined threshold. The threshold operative upon shut-off 43 to disable gates 30 through 33 is selected to correspond to the speed of armature encoder 41 at which the above-described lack of resolution ability approaches and a danger exists that the system will erroneously determine that armature encoder 41 is static. This failure mode is avoided by the operation of the present invention overspeed detector and shut-off circuit 43. As the speed of armature encoder 41 increases, the output signal of overspeed detector 42 increases correspondingly. When the speed of armature encoder 41 reaches the threshold speed, the corresponding output voltage of overspeed detector 42 is operative to trip shut-off 43 causing gates 30 through 33 to be disabled and instituting the interruption in power switches 11 through 14 which in turn deprives motor 34 of armature current.

Thus, the system is protected by the operation of master control 40, armature encoder 41 and overspeed detector 42 and shut-off 43 against the above-described overspeed failure mechanism. It should be noted that the protection of the present invention system from overspeed failure mode is accomplished without compromising the resolution of encoder 41.

Figure 2:
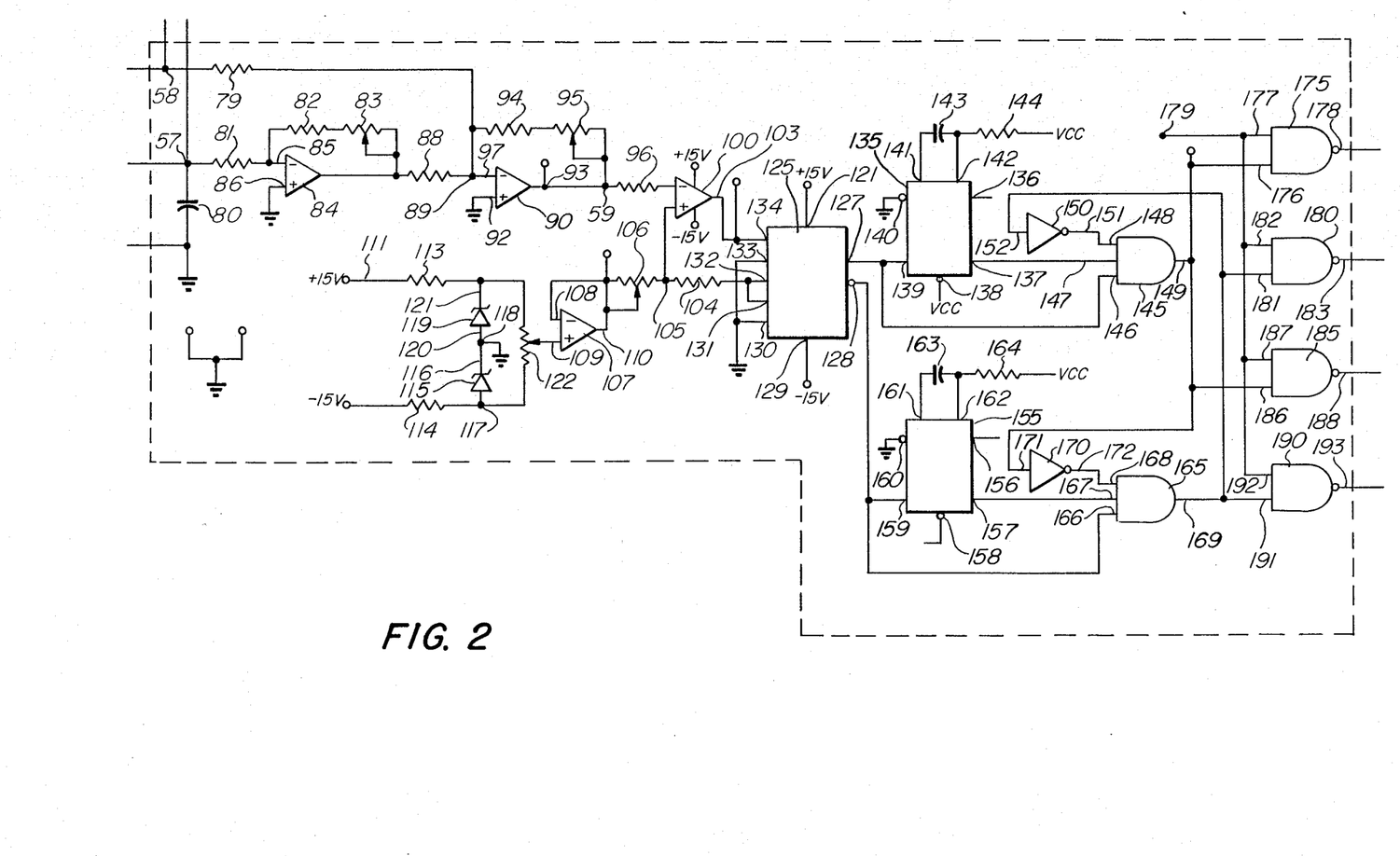
FIG. 2 is a schematic diagram of the discriminator, timing and gate systems of the present invention.

FIG. 2 sets forth a schematic diagram of the discriminator, timing and gates systems of the present invention. Input terminal 57 should be understood to be coupled to master control 40 as shown in FIG. 1. Similarly, input terminal 58 should be understood to be coupled to isolation amplifier 52 as shown in FIG. 1. A capacitor 80 is coupled to input terminal 57 and to ground and inverting amplifier 84 includes a non-inverting input 86 coupled to ground and inverting input 85 coupled to terminal 57 by a resistor 81 and an output terminal 87. A series combination of a resistor 82 and a rheostat 83 is coupled between input terminal 85 and output terminal 87. A resistor 88 is coupled to output terminal 87 and a junction terminal 89. A resistor 79 is coupled between input terminal 58 and junction 80. A high gain amplifier 90 includes a non-inverting input 92 coupled to ground and inverting input 91 coupled to junction 89 and an output terminal 93. A resistor 94 and a rheostat 95 are serially connected between input terminal 91 and output terminal 93. An amplifier 100 includes a non-inverting input 102, an inverting input 101 and an output terminal 103. A resistor 96 couples junction 59 with input 101 of amplifier 100. A resistor 104 is coupled between output terminal 103 and non-inverting input terminal 102 of amplifier 100. A positive low voltage supply 111 is coupled to a resistor 113 while a negative supply 112 is coupled to a resistor 114. A voltage divider 122 is coupled between the remaining ends of resistors 113 and 114. A diode 115 and anode 117 coupled to resistor 114 and a cathode 116 coupled to a common junction 118 which in turn is coupled to ground. A second diode 119 has an anode electrode coupled to junction 118 and a cathode electrode coupled to resistor 113. An amplifier 107 has a non-inverting input terminal 109 coupled to the moveable wiper of voltage divider 122 and inverting input 108 and an output terminal 110. Output 110 and input terminal 108 are commonly coupled to one end of a rheostat 106. The remaining end of rheostat 106 is coupled to input terminal 102 of amplifier 100 at a reference junction 105. A voltage squaring circuit 125 comprises an LM361 integrated circuit having a positive supply terminal 126 and a a negative supply terminal 129. Squaring circuit 125 further includes a non-inverting output terminal 127 and an inverted output terminal 128. Squaring circuit 125 further includes an input terminal 134 coupled to the junction of resistor 104 and output terminal 103 of amplifier 100. Squaring circuit 125 further includes a second input terminal 133 and a ground terminal 130 which are commonly coupled to ground. Squaring circuit 125 further includes an ST1 terminal 131 and a ST2 terminal 132 which are commonly coupled to a source of operating potential. A timing circuit 125 comprises a blank integrated circuit having an RC terminal 112 and a C1 terminal 141 coupled together by a capacitor 143. Terminal 112 is further coupled to a source of operating potential by a resistor 144. Timing circuit 135 further includes a Q1 terminal 136 which is unconnected and a -Q1 terminal 137. Circuit 135 further includes a reset terminal 138 which is unconnected. Circuit 135 further includes an A1 terminal 140 which is connected to ground and a B1 terminal 139 which is connected to terminal 127 of circuit 125. A three input AND gate 145 has a first input 146 coupled to output 127 of circuit 125, a second input 147 coupled to terminal 137 of circuit 135 and an input 148 and an output terminal 149. An inverting amplifier 150 has an input terminal 152 and an output terminal 151 coupled to input 148.

A timing circuit 155 has a Q2 terminal 156 unconnected and a -Q2 terminal 157. Circuit 155 further includes a C2 terminal 161 and an RC terminal 162. RC terminal 162 is coupled to a source of operating potential by a resistor 164 and to terminal 161 by a capacitor 163. Circuit 155 further includes an inverting input 160 coupled to ground and a non-inverting input 159 coupled to inverting output 128 of circuit 125. A three input AND gate 165 includes a first input 166 coupled to output 128 of circuit 125, a second input 167 coupled to terminal 157 of circuit 155, a third input terminal 168 and an output terminal 169. An inverting amplifier 170 has an input terminal 171 coupled to output terminal 149 of gate 145 and an output terminal 172 coupled to input 168 of gate 165.

An AND gate 175 has an input 176 coupled to output terminal 149 of gate 145 and an input terminal 127 coupled to voltage shut-off 43 (as shown in FIG. 1) and an output terminal 178. A NAND gate 180 has an input terminal 181 coupled to output terminal 169 of gate 165, an input terminal 182 coupled to input terminal 127 and an output terminal 183. A NAND gate 185 has an input terminal 186 coupled to output terminal 149 of gate 145, an input terminal 187 coupled to input 127 and an output terminal 188. A NAND gate 180 has an input terminal 191 coupled to output 169 of gate 165, an input terminal 192 coupled to input 127 and an output terminal 193. Output terminals 178, 183, 188 and 193 are coupled to drivers 20, 21, 22 and 23 as shown in FIG. 1.

In operation, the input signal from master control 40 applied to input terminal 57 is amplified and inverted by amplifier 84 and coupled by resistor 88 to junction 89. Similarly, the input motor current signal coupled to input terminal 58 is coupled by resistor 79 to junction 89. At junction 89, the inverted signal from master control 40 and the motor current signal from input terminal 58 are added producing a different signal which is applied to high gain amplifier at inverting input 91. As a result of the summing at junction 89, the signal amplified and appearing at output terminal 93 of amplifier 90 comprises the difference signal or error signal of the motor control system. This error system is coupled by resistor 96 to the inverting input 101 of amplifier 100. The combination of resistors 113 and 114 and diodes 115 and 119 together with potentiometer and amplifier 107 provide a reference voltage at junction 105 the amplitude of which may be adjusted by adjustment of rheostat 106. Amplifier 100 has a reference voltage input at input 102 and therefore produces an output error signal which is applied to squaring circuit 125. As configured, circuit 125 is essentially a bistable circuit having two operable output states. In the first output state a positive output appears at terminal 127 and in the second operating state, a negative output appears at terminal 128. The outputs of squaring circuit 125 comprise a positive going signal at terminal 127 and a negative going signal at 128. The positive going output of squaring circuit 125 is coupled to the input of timing circuit 135. The combination of timing circuit 135, inverting amplifier 150 and AND gate 145 provide a timing operation on the positive going signal coupled from output terminal 127 of circuit 125 to output terminal 149 of gate 145. Similarly, the negative going input signal is applied to timing circuit 155 which processes the negative going signal appearing at output terminal 169 in accordance with the following. The combination of circuits 135 and gate 145, together with circuit 155 and gate 165, are regeneratively coupled by inverting amplifiers 150 and 170 respectively to preclude the simultaneous operation of gates 145 and 165. This timing function is carried forward to achieve the above-described timing of timing circuits 25 and 26 to provide that switching circuits 11 and 13 and switching circuits 12 and 14 are operated exclusive of each other and never simultaneously. NAND gates 175, 180, 185 and 190 each have one respective input commonly coupled to shut-off circuit 43 (seen in FIG. 1) and their remaining inputs coupled in pairs to gates 149 and 165. As a result, the output signal of gate 149 enables gates 175 and 185 to produce output signals at output terminals 178 and 188 respectively. Similarly, the output signal of gate 165 at terminal 169 enables gates 180 and 190 producing output signals at output terminals 183 and 193. As described above, the outputs of gates 175, 180, 185 and 190 are operative upon switching circuits 11 through 14 in accordance with the above-described power switching operation.

Figure 3:
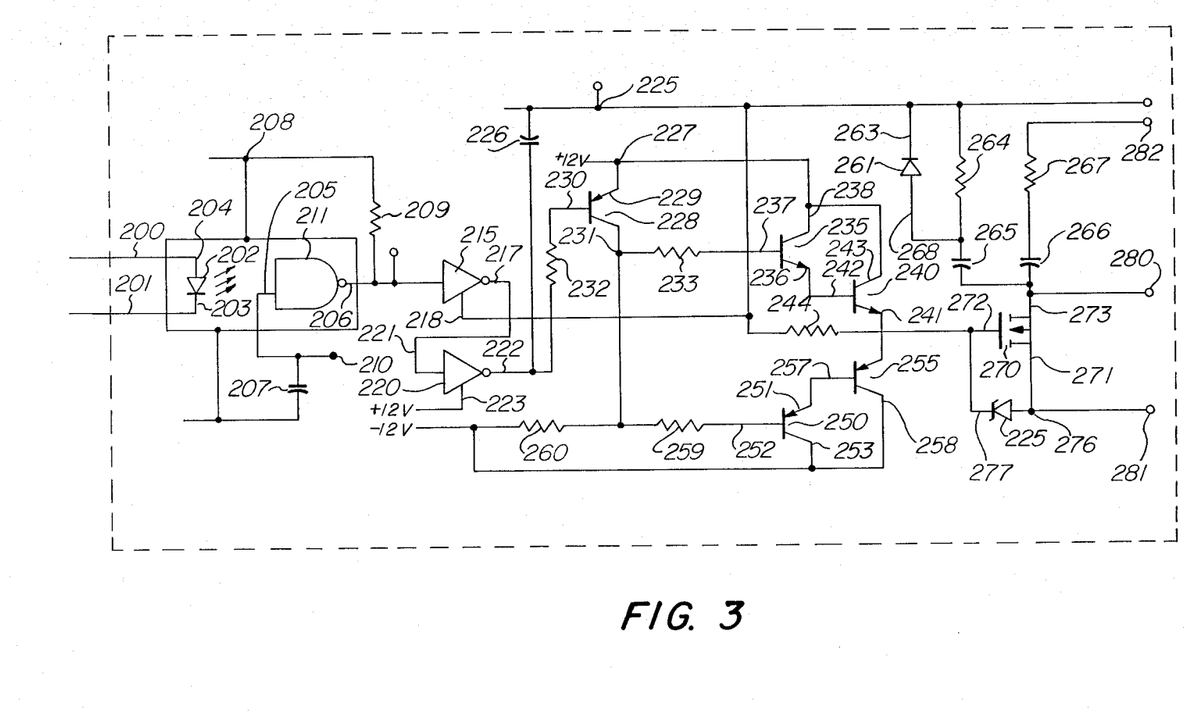
FIG. 3 is a schematic diagram of a typical driver circuit of the present invention.

FIG. 3 sets forth a schematic diagram of driver circuits 20, 21, 22 and 23. As mentioned above, driver circuits 20 through 23 are identical in construction and operation. Accordingly, FIG. 3 will be used to describe the construction of the driver circuits, it being understood that each of driver circtuis 20 through 23 comprise the structure set forth in figure 3. Input terminals 200 and 201 which receive the output of a selected one of gates 175, 180, 185 and 190, depending upon which driver circuit the circuit of FIG. 3 represents, provide the input signal for the driver of FIG. 3. A light emitting diode 202 has a cathode electrode 203 connected to input terminal 201 and an anode electrode 204 connected to input terminal 200. A photo sensitive amplifier 211 has an input terminal 205 coupled to a source of low voltage operating bias 210 and an output terminal 206. By means not shown, photo sensitive amplifier 211 is coupled to a source of operating potential 208. A capacitor 207 couples terminal 205 to a source of ground potential. A bias resistor 209 couples output 206 to operating supply 208. An inverting amplifier 215 has an input terminal 216 coupled to terminal 206 and an output terminal 217 and a supply terminal 218 coupled to a source of operating potential 225. An inverting amplifier 220 has an input terminal 221 coupled to output terminal 217 of amplifier 215, an output terminal 222 and a operating supply terminal 223. A capacitor 226 couples output terminal 222 to supply 225. A transistor 228 has an emitter electrode 229 coupled to a source of operating supply 227, a base electrode 230 coupled to terminal 222 by a resistor 232 and a collector electrode 231 coupled to the junction of a resistor 260 and a resistor 259. Resistor 260 is coupled at its other end to a source of negative operating potential. A transistor 235 has an emitter electrode 236, a base electrode 237 coupled to collector 231 by a resistor 233 and a collector electrode 238 coupled to operating supply 227. A transistor 240 has an emitter electrode 241, a base electrode 242 coupled to emitter 236 and a collector electrode 243 coupled to collector 238. A transistor 250 has an emitter electrode 251, a base electrode 252 coupled to resistor 259 and a collector electrode 253 coupled to a source of negative operating supply. A transistor 255 has an emitter electrode 256 coupled to emitter 241, a base electrode 257 coupled to emitter 251 and a collector electrode 258 coupled to a source of negative operating supply. A resistor 244 couples emitters 241 and 256 to supply 225. A diode 261 has a cathode electrode 263 coupled to supply 265 and an anode electrode 262. A resistor 264 is coupled between anode 262 and supply 225. A field effect transistor 270 has a source electrode 271, a gate electrode 272 and a drain electrode 273. A capacitor 265 couples the junction of resistor 264 and anode 262 to output terminal 280. Drain 273 is coupled to output terminal 280, AND gate 272 is coupled to emitters 241 and 256. A zener diode 275 has a cathode 277 coupled to gate 272 and an anode 276 coupled to source 271. The series combination of a capacitor 266 and a resistor 267 couples drain electrode 273 to terminal 282.

In operation, the input signal at terminals 200 and 201 coupled from the selected one of gates 175, 180, 185 and 190 (seen in FIG. 2) energizes light emitting diode 202 causing a light output therefrom when a signal is present at terminals 200 and 201. The output light from light emitting diode 202 is received by photo sensitive amplifier 211 and is inverted and amplified thereby and applied to a pair of amplifiers 215 and 220. The function of the light coupling between light emitting diode 202 and light sensitive amplifier 211 provides isolation of the gate circuitry from the remainder of the system to insure that the low level gate circuitry of the output gates and timing circuits is not affected by the high power currents present in the remainder of the system. The output of amplifier 220 is further amplified by transistor 228 and thereafter coupled to a pair of Darlington configured transistor pairs. Resistor 233 couples the output of transistor 228 to the Darlington amplifier pair formed by transistors 235 and 240 while resistor 259 couples the output of transistor 228 to a second Darlington pair of transistors 250 and 255. It should be noted that while transistors 235 and 240 are NPN transistors, transistors 250 and 255 are PNP transistors, the resulting configuration comprises a DC coupled stacked arrangement in which the output signal is taken from the junction of emitters 241 and 256. The output signal of the Darlington pairs is applied to the gate electrode 272 of field affect transistor 270. Transistor 270 has its source 271 coupled to an output terminal 281 and its drain electrode coupled to an output terminal 280. A series combination of capacitor 266 and resistor 267 are coupled to an output terminal 282. As will be shown and described below in conjunction with FIG. 4, field affect transistor 270 is operative in response to the output of the Darlington transistor pairs to operate the base junction of the transistors within the power switching circuits operative upon motor 34. Suffice it to note here however that the driver circuit shown in FIG. 3 provides an optically isolated amplifier configuration which raises the signal level provided by the selected one of gates 175, 180, 185 and 190 to a power level sufficient to drive the output devices found in the power switching circuits shown in FIG. 3.

Figure 4:
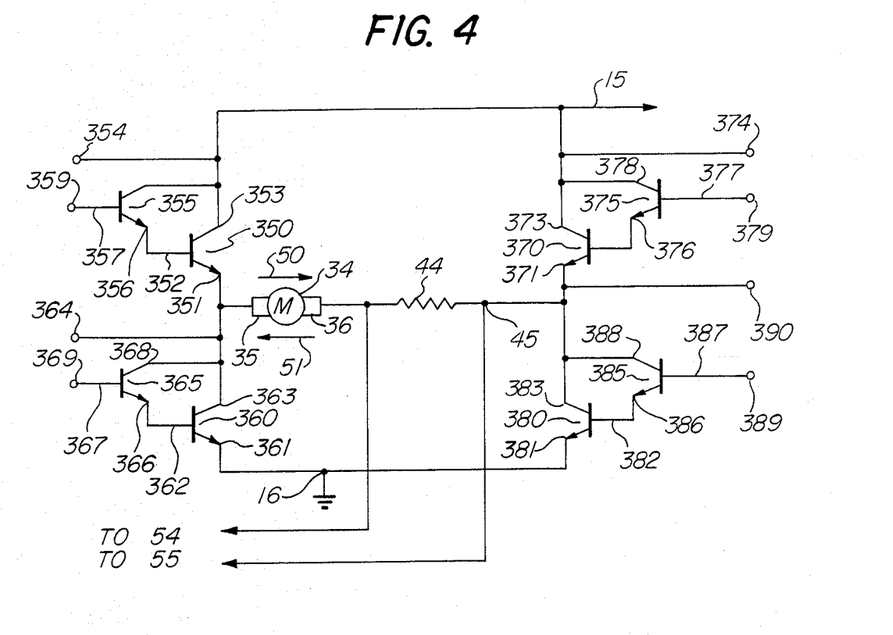
FIG. 4 is a schematic diagram of the motor amplifier switching system of the present invention.

FIG. 4 sets forth a schematic diagram of power switching cirtuis 11, 12, 13 and 14 together with motor 34. A transistor 350 has an emitter 351, a base 352 and a collector 353. Collector 353 is coupled to the positive motor supply terminal 15. A transistor 355 has an emitter 356 coupled to base 352, a base 357 and a collector 358 coupled to collector 353. A transistor 360 has an emitter 361 coupled to a source of ground potential 16, a base 362 and a collector 363 coupled to junction 46 and to emitter 351 of transistor 350. A transistor 365 has an emitter electrode 366 coupled to base 363, a base 367 and a collector 368 coupled to collector 363.

A transistor 370 has an emitter 371 coupled to a junction 45, a base 372 and a collector 373 coupled to the source of operating potential 15. A transistor 375 has an emitter 376 coupled to base 372, a base 377 and a collector 378 coupled to collector 373. A transistor 380 has an emitter electrode 381 coupled to a source of ground potential 16, a base 382 and a collector electrode 383 coupled to junction 45. A transistor 385 has an emitter electrode 386 coupled to base 382, a base electrode 387 and a collector electrode 388 coupled to collector 383.

A motor 34 has an armature terminal 35 coupled to junction 46 and an armature terminal 36 coupled to junction 45 by a shunt resistor 44. Armature terminal 36 is coupled to input 54 while junction 45 is coupled to input 55 (both shown in FIG. 1).

It should be noted that the Darlington pair formed by transistors 355 and 350 comprise switching circuit 12 in FIG. 1. Similarly, the Darlington transistor pair formed by transistors 360 and 365 comprise switching circuit 13 of FIG. 1. The Darlington pair of transistors 370 and 375 comprise the switching circuit 11 in FIG. 1 and the Darlington pair of transistors 380 and 385 comprise switching circuit 14 of FIG. 1. Accordingly, each Darlington transistor pair includes a pair of input terminals coupled to the input transistor base and the other coupled to the input transistor collector. For example, in the pair formed by transistors 350 and 355, input terminals 359 and 354 are coupled to the base and collector respectively of transistor 355. Similarly, with respect to the transistor pair of transistors 360 and 365, input terminals 369 and 364 are coupled to the base 367 and collector 363 respectively of input transistor 365. In the same manner, with respect to the transistor pair formed by transistors 370 and 375, input terminals 379 and 374 are coupled to base 377 and collector 378 respectively of input transistor 377 and input terminals 389 and 390 are coupled respectively to base 387 and collector 383 of input transistor 385. With reference to FIG. 3, it should be noted that in the typical coupling of the driver circuit shown, output terminal 281 would be coupled to the base input of the respective transistor pair to which the driver circuit is coupled and output terminal 280 would be coupled to the respective collector input terminal. For example, if the driver of FIG. 3 is coupled to the transistor pair formed by transistors 350 and 355, output terminal 281 is coupled to input terminal 359 and output terminal 280 is coupled to input terminal 354. In addition, it should be noted that terminal 282 of the driver in FIG. 3 would also be coupled to terminal 354. A similar configuration would result in the coupling of the respective drivers to the remaining three power switching transistor pairs.

As mentioned above, the operation of the present invention brush motor amplifier provides that power is coupled through motor 34 by the activation of the appropriate pair of power switching devices. Accordingly, and as described above in conjunction with FIG. 1, the result in current through motor 34 is controlled by the duration of respective operations of the Darlington transistor pairs. For example, with the transistor pair of 350 and 355, together with the transistor pair 380 and 385 operative in response to their respective input signals from their driver circuits, transistor 350 and transistor 380 are turned on fully and current flow through motor 34 in the direction indicated by arrow 50. Conversely, with activation of the transistor pair formed by transistors 370 and 375, and the transistor pair formed by transistors 360 and 365, transistors 370 and 360 are fully conductive and current flows through motor 34 in the direction of arrow 51. It should be noted, and in accordance with an important aspect of the present invention, motor 34 is entirely dependent upon the conduction of the switching transistors within the circuit of FIG. 4 for its armature current. Accordingly, in the absence of drive signals to the respective inputs of the transistor pairs, no motor current flows through motor 34.

Figure 5:
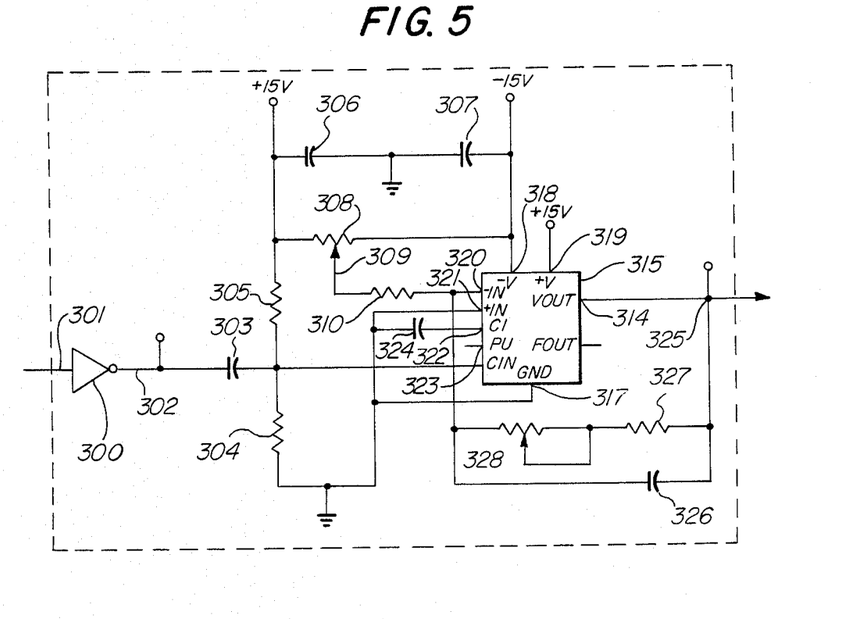
FIG. 5 is a schematic diagram of the overspeed control portion of the present invention.

FIG. 5 sets forth a schematic diagram of the overspeed detector of the present invention. An input terminal 301 should be understood to be coupled to armature encoder 41 as shown in FIG. 1. An inverting amplifier 300 has an input terminal 301 and an output terminal 302. A series resistor pair 305 and 304 are coupled from a source of operating potential to ground. The junction of resistors 304 and 305 is coupled to terminal 302 by a capacitor 303. An integrated circuit 315 is configured to form a frequency to voltage converter and, in its preferred form, comprises an integrated circuit manufactured by Burr-Brown having a generic part number VFC62BG. It should be apparent to those skilled in the art however that other frequency to voltage converter circuits may be substituted for integrated circuit 315 without departing from the spirit and scope of the present invention. It should also be noted that while the respective terminals utilized in the frequency to voltage converter of integrated circuit 315 have been numbered in accordance with patent reference numbers, the individual terminal designations commonly used in the electronics art to functionally describe the terminals have been retained to functionally assist in understanding the circuit shown in FIG. 5. Accordingly, integrated circuit 315 includes a positive V terminal 319 coupled to a source of positive operating potential and a negative V terminal 318 coupled to a source of negative operating potential. A negative input terminal 320 is coupled to one end of a resistor 310, the other end of which is coupled to a wiper 309 of a voltage divider 308. Positive input terminal 321 is coupled to C1 terminal 322 by a capacitor 324. A CIN terminal 323 is coupled to the junction of resistors 304 and 305 while a ground terminal 317 is coupled directly to ground. A V output terminal 316 is coupled to output terminal 325. A capacitor 326 is coupled between output terminal 325 and input terminal 320. A series combination of a resistor 327 and a rheostat 328 are coupled in parallel with capacitor 325. A voltage divider 308 is coupled between a source of positive operating potential and a source of negative operating potential and a pair of capacitors 306 and 307 are coupled to ground from the positive and negative operating potential sources respectively.

In operation, the output signal of armature encoder 41 in the form of a plurality of positive going pulses is coupled to input terminal 301 and is amplified and inverted by inverter 300 and thereafter coupled by capacitor 303 to input terminal 323 of integrated circuit 315. As a result, a supply of pulse signals, the frequency of which directly corresponds to the rotational speed of armature encoder 41, is applied to input terminal 323. In accordance with the voltage to frequency version operation of integrated circuit 315, the input pulses applied to input terminal 323 produce an output signal at terminal 316 which comprises an analog voltage proportional to the frequency of input signals at terminal 323. As a result, the frequency of armature encoder 41 (shown in FIG. 1) is indicated by the analog voltage appearing at output terminal 325. Output terminal 325 is coupled to shut-off 43 (shown in FIG. 1). With reference to FIG. 1, it should be recalled that shut-off 43 comprises a threshold operative circuit in which the output signal is maintained in the absence of an input signal exceeding a predetermined threshold. Accordingly, and in simultaneous reference to FIGS. 1 and 5, as the speed of armature encoder 41 increases, the frequency of incoming signals applied to terminal 332 of integrated circuit 315 also increases. This increase in frequency results in an increase in the amplitude of the analog voltage produced at terminal 325. The increasing signal is applied to shut-off 43. At a predetermined point at which the frequency of incoming signals from armature encoder 41 apply to input terminal 323 of integrated circuit 315 produces a voltage level at output terminal 325 sufficient to activate the switching threshold circuitry within shut-off 43. Upon such occurrence, and as mentioned above, shut-off 43 interrupts the output signal applied to gates 30 through 33. With reference to FIG. 2, it should be noted that input terminal 179 comprises the point at which the enabling signal from shut-off 43 is applied.

What has been shown is an improved brush motor amplifier in which an overspeed detector is operative upon the armature encoder of the system to provide a frequency dependent voltage which in turn is operative to remove the armature current from the motor in the event the motor speed exceeds a predetermined rotational speed.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. An amplifier control system for controlling the armature current of a DC brush motor comprising:
    a supply of DC operating voltage;
    a first pair of current switching deivces connecting to said voltage supply and said DC brush motor for driving said motor in a first direction;
    a second pair of current switching devices connecting to said voltage supply and said DC brush motor for driving said motor in a second direction;
    a plurality of driver circuits connected to each of said current switching devices in said first and second pairs;
    a gate circuit operative upon the driver circuits to provide switching signals for operation of said first and second pairs of current switching devices;
    speed sensing means for sensing the speed of the armature rotation of said DC brush motor, said speed sensing means including an encoder coupled to said brush motor for producing an output signal indicative of the motor speed and comparison means comparing said encoder signal to a predetermined maximum motor speed for establishing a reference voltage corresponding to a predetermined maximum motor speed threshold; and
    shut off means, coupled to said comparison means, operative upon said gate circuit to interrupt said first and second current switching devices in the event the motor speed exceeds said predetermined maximum motor speed threshold,
    said gate circuit including a plurality of gates each having one input commonly connected to said shut-off means.

2. An amplifier control system as set forth in claim 1 wherein said shut-off means include a switch for providing an enabling voltage to said commonly connected inputs of said plurality of gates.

3. An amplifier control system as set forth in claim 2 wherein said encoder includes an optical encoding and detecting system.

* * * * *